(12) United States Patent
Onose

(10) Patent No.: US 8,514,899 B2
(45) Date of Patent: Aug. 20, 2013

(54) LASER SYSTEM AND LASER LIGHT GENERATION METHOD

(75) Inventor: Takashi Onose, Oyama (JP)

(73) Assignee: Gigaphoton Inc., Oyama-shi (JP)

( * ) Notice: Subject to any disclaimer, the term of this patent is extended or adjusted under 35 U.S.C. 154(b) by 0 days.

(21) Appl. No.: 13/420,304

(22) Filed: Mar. 14, 2012

(65) Prior Publication Data

US 2012/0250708 A1 Oct. 4, 2012

(30) Foreign Application Priority Data

Mar. 28, 2011 (JP) ................................ 2011-071166

(51) Int. Cl.
*H01S 3/10* (2006.01)
(52) U.S. Cl.
USPC ......... 372/25; 372/8; 372/21; 372/30; 372/69
(58) Field of Classification Search
USPC ............................................ 372/8, 21, 25, 30
See application file for complete search history.

(56) References Cited

U.S. PATENT DOCUMENTS

| | | | |
|---|---|---|---|
| 5,689,363 A | 11/1997 | Dane et al. | |
| 6,816,520 B1 | 11/2004 | Tulloch et al. | |
| 7,564,879 B2 | 7/2009 | Tanaka et al. | |
| 7,593,437 B2 | 9/2009 | Staroudoumov et al. | |
| 7,593,440 B2 | 9/2009 | Spinelli et al. | |
| 2005/0018723 A1 | 1/2005 | Morita et al. | |
| 2005/0271110 A1* | 12/2005 | Paetzel et al. | 372/65 |
| 2008/0267242 A1* | 10/2008 | Ershov et al. | 372/57 |
| 2009/0067468 A1 | 3/2009 | Brown et al. | |
| 2010/0220756 A1* | 9/2010 | Krzysztof et al. | 372/38.02 |

FOREIGN PATENT DOCUMENTS

| | | |
|---|---|---|
| JP | 09-214023 | 8/1997 |
| JP | 11-046025 | 2/1999 |
| JP | 2000-156535 | 6/2000 |
| JP | 2008-122785 | 5/2008 |

* cited by examiner

*Primary Examiner* — Dung Nguyen
(74) *Attorney, Agent, or Firm* — Hogan Lovells US LLP

(57) ABSTRACT

A laser system may include a master oscillator that outputs pulsed laser light, an amplification device that amplifies the pulsed laser light outputted from the master oscillator, and a controller that controls the master oscillator and the amplification device. The master oscillator may have a pumping laser that outputs pumping light, a seed laser that is oscillated by the pumping light, an amplifier that amplifies the pulsed laser light outputted by the seed laser using the pumping light, and at least one optical shutter disposed in the optical path between the seed laser and the amplifier. The controller may control the opening and closing of the optical shutter and discharging of the amplification device so that the amplification device discharges when the pulsed laser light that has passed through the optical shutter passes through the amplification device.

7 Claims, 13 Drawing Sheets

LASER SYSTEM AND LASER LIGHT GENERATION METHOD

CROSS-REFERENCE TO RELATED APPLICATION

The present application claims priority from Japanese Patent Application No. 2011-071166 filed Mar. 28, 2011.

BACKGROUND

1. Technical Field

This disclosure relates to laser systems and laser light generation methods.

2. Related Art

Typical ultraviolet excimer lasers used in semiconductor lithography processes include a KrF excimer laser having a wavelength of approximately 248 nm and an ArF excimer laser having a wavelength of approximately 193 nm.

Most such ArF excimer lasers are supplied to market as two-stage laser systems that include an oscillation stage laser and an amplifier stage. A basic configuration that is common between the oscillation stage laser and the amplifier stage in a two-stage ArF excimer laser system will be described. The oscillation stage laser has a first chamber, whereas the amplifier stage has a second chamber. A laser gas (a mixed gas including $F_2$, Ar, Ne, and Xe) is confined in the respective first and second chambers. The oscillation stage laser and amplifier stage also have power sources that supply electrical energy for pumping the laser gas. Separate power sources may be provided for the oscillation stage laser and the amplifier stage respectively, but a single power source can also be shared between the two. First discharge electrodes including a first anode and a first cathode that are both connected to the power source are provided within the first chamber. Similarly, second discharge electrodes including a second anode and a second cathode that are both connected to the power source are provided within the second chamber.

A configuration unique to the oscillation stage laser is, for example, a line narrowing module. A line narrowing module typically includes a single grating and at least one prism beam expander. An optical resonator is formed by a semitransparent mirror and the grating, and the first chamber of the oscillation stage laser is disposed between the semitransparent mirror and the grating.

When a discharge is generated between the first anode and the first cathode of the first discharge electrodes, the laser gas is pumped, and light is generated when the pumping energy is emitted. This light results in laser light whose wavelength has been selected by the line narrowing module, and the laser light is outputted from the oscillation stage laser.

A two-stage laser system in which the amplifier stage is a laser including a resonator structure is called "MOPO," whereas a two-stage laser system in which the amplifier stage is not a laser without a resonator structure is called "MOPA." When the laser light from the oscillation stage laser is present within the second chamber of the amplifier stage, control is carried out so that a discharge is created between the second anode and the second cathode of the second discharge electrodes. Thus, the laser gas within the second chamber is pumped, and the laser light is outputted from the amplifier stage after being amplified.

SUMMARY

A laser system according to one aspect of this disclosure may be a laser system including a master oscillator that outputs pulsed laser light, an amplification device that amplifies the pulsed laser light outputted from the master oscillator, and a controller that controls the master oscillator and the amplification device. The master oscillator may have a pumping laser that outputs pumping light, a seed laser that is oscillated by the pumping light, an amplifier that amplifies the pulsed laser light outputted by the seed laser using the pumping light, and at least one optical shutter disposed in the optical path between the seed laser and the amplifier. The controller may control the opening and closing of the optical shutter and discharging of the amplification device so that the amplification device discharges when the pulsed laser light that has passed through the optical shutter passes through the amplification device.

A laser light generation method according to another aspect of this disclosure may be a laser light generation method for an apparatus that includes a master oscillator having a pumping laser that outputs pumping light, a seed laser that is oscillated by the pumping light, an amplifier that amplifies the pulsed laser light outputted by the seed laser using the pumping light, and at least one optical shutter disposed in the optical path between the seed laser and the amplifier. The apparatus also includes an amplification device that amplifies the pulsed laser light outputted from the master oscillator. The method may include: controlling the opening and closing of the optical shutter and discharging of the amplification device so that the amplification device discharges when the pulsed laser light that has passed through the optical shutter passes through the amplification device.

BRIEF DESCRIPTION OF THE DRAWINGS

Embodiments of this disclosure will be described hereinafter with reference to the appended drawings.

DESCRIPTION OF PREFERRED EMBODIMENTS

Figure 1:
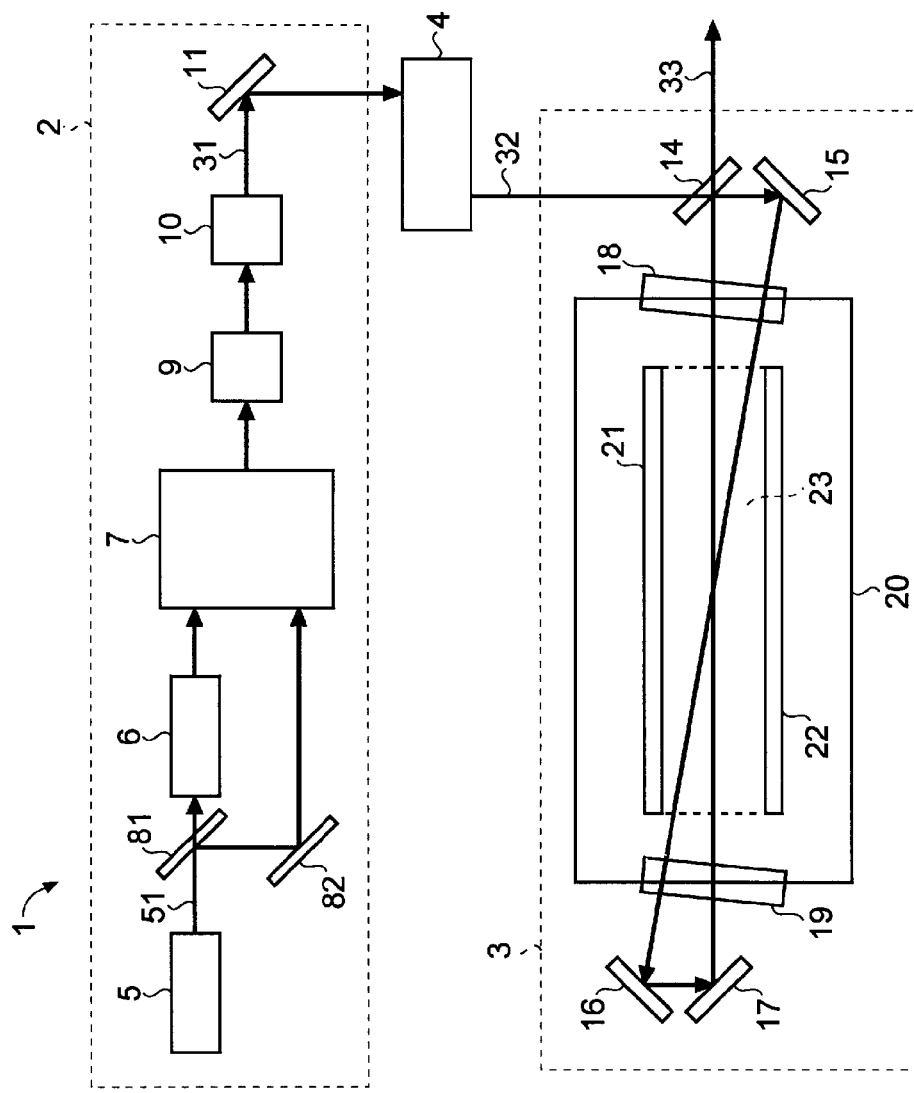
FIG. 1 schematically illustrates an example of a two-stage laser apparatus using a solid-state laser device having a wavelength conversion element according to a first embodiment of this disclosure.

Embodiments of this disclosure will be described in detail hereinafter with reference to the drawings. The embodiments described hereinafter indicate examples of this disclosure, and are not intended to limit the scope of this disclosure. Furthermore, not all of the configurations and operations described in the embodiments are requisite in this disclosure. Note that identical components will be given identical reference numerals, and duplicate descriptions thereof will be omitted. The embodiments of this disclosure will be described following the contents below.

1. Outline
2. Explanation of Terms
3. Laser System Including Master Oscillator and Amplification Device (First Embodiment)
3.1 Configuration
3.2 Operations
4. Master Oscillator with Optical Shutter Disposed within Optical Path (Second Embodiment)
4.1 Configuration
4.1.1 Optical Shutter
4.2 Operations
4.3 Effects
5. Laser System Including Master Oscillator Having Optical Shutter and Amplification Device (Third Embodiment)
5.1 Configuration
5.2 Operations
5.3 Timing Chart
5.4 Flowcharts
5.5 Effects
6. Additional Descriptions
6.1 Ti:sapphire Laser
6.2 Amplifier (PA)
6.3 Amplifier Including Optical Resonator (PO)

1. Outline

The operational timing of an optical shutter disposed within a master oscillator may be synchronized with the timing at which a discharge-pumped amplification device containing a laser gas is caused to operate (discharge).

2. Explanation of Terms

A "KBBF crystal" is a nonlinear optical crystal expressed by a chemical formula $KBe_2BO_3F_2$, and serves as a wavelength conversion element. "Burst oscillation" refers to outputting pulsed laser light at a predetermined repetition rate during a predetermined period. An "optical path" is a path along which laser light travels.

3. Laser System Including Master Oscillator and Amplification Device

First Embodiment 3.1 Configuration

FIG. 1 schematically illustrates an example of a two-stage laser apparatus according to a first embodiment of this disclosure.

A two-stage laser apparatus (called a "laser system" hereinafter) 1 includes, broadly speaking, a master oscillator 2 and an amplification device 3. The master oscillator 2 may, for example, include a wavelength conversion element. The amplification device 3 may, for example, be a discharge-pumped ArF excimer amplifier. A low-coherence optical system 4 may be disposed between the master oscillator 2 and the amplification device 3. A system such as an optical pulse stretcher, a random phase plate, or the like may be employed as the low-coherence optical system 4.

The master oscillator 2 will be described next. The master oscillator 2 may include a pumping laser 5, a Ti:sapphire laser 6, an amplifier 7, a beam splitter 81, a high-reflection mirror 82, an LBO crystal 9, a KBBF crystal 10, and a high-reflection mirror 11.

The pumping laser 5 may be a laser that, for example, oscillates second harmonic light of a semiconductor laser-pumped Nd:YAG laser. The Ti:sapphire laser 6 may include a Ti:sapphire crystal and an optical resonator. The amplifier 7 may be an amplifier that includes a Ti:sapphire crystal.

The amplification device 3 will be described next. The amplification device 3 may include a chamber 20, a pair of discharge electrodes (an anode 21 and a cathode 22), an output coupler 14, and high-reflection mirrors 15, 16, and 17. A laser gas may be confined in the chamber 20. This laser gas may be a mixed gas of Ar, Ne, $F_2$, and Xe. The anode 21 and the cathode 22 may be disposed within the chamber 20. The anode 21 and the cathode 22 may be disposed in the vertical direction as illustrated in FIG. 1. The area between the anode 21 and the cathode 22 may be a discharge space 23. Windows 18 and 19, through which pulsed laser light 32 passes, may be provided in the chamber 20. In addition, a power source (not shown) may be disposed outside the chamber 20.

A ring optical resonator may be formed by the output coupler 14 and the high-reflection mirrors 15, 16, and 17. The output coupler 14 may be an element that transmits some light and reflects another part of the light.

3.2 Operations

The master oscillator 2 may output pulsed laser light 31 having a wavelength of approximately 193 nm. The low-coherence optical system 4 may then reduce the coherence of the pulsed laser light 31. The amplification device 3 may amplify the pulsed laser light 32, whose coherence has been reduced, and output that light as pulsed laser light 33. The pulsed laser light 33 may, for example, be transmitted to a semiconductor exposure apparatus (not shown) and used in exposure processes.

Pumping light 51 having a wavelength of approximately 532 nm may be outputted from the pumping laser 5. Part of the pumping light 51 may pass through the beam splitter 81. Another part of the pumping light 51 may be reflected by the beam splitter 81. The pumping light 51 that has passed through the beam splitter 81 may pump the Ti:sapphire laser 6. Pulsed laser light having a wavelength of approximately 773.6 nm may be outputted from the pumped laser 6. Here, the Ti:sapphire laser 6 may include an optical resonator provided with a wavelength selection element (not shown). Pulsed laser light having a spectral width that has been narrowed by the wavelength selection element may be outputted from the Ti:sapphire laser 6.

Of the pumping light 51 outputted from the pumping laser 5, the pumping light 51 reflected by the beam splitter 81 may further be reflected by the high-reflection mirror 82. The reflected pumping light 51 may enter the Ti:sapphire amplifier 7 and may then pump the Ti:sapphire crystal provided therein. The amplifier 7 may amplify the pulsed laser light outputted from the Ti:sapphire laser 6 using that pumping energy. As a result, pulsed laser light having a wavelength of approximately 773.6 nm may be outputted from the amplifier 7.

The pulsed laser light outputted from the Ti:sapphire amplifier 7 may be transformed into pulsed laser light having a wavelength of approximately 386.8 nm (half the aforementioned 773.6 nm) by passing through the LBO crystal 9, which serves as a wavelength conversion element. The pulsed laser light which has experienced wavelength conversion may further be transformed into pulsed laser light 31 having a wavelength of approximately 193.4 nm (half the aforementioned 386.8 nm) by passing through the KBBF crystal 10, which serves as another wavelength conversion element.

The travel direction of the pulsed laser light 31 that has passed through the KBBF crystal 10 may be changed by the high-reflection mirror 11, and the pulsed laser light 31 may enter the low-coherence optical system 4. The coherence of the pulsed laser light 31 may be reduced by passing through the low-coherence optical system 4. The pulsed laser light 32 whose coherence has been reduced may then enter the amplification device 3.

The power source electrically connected to the anode 21 and the cathode 22 within the chamber 20 may apply a potential difference between the anode 21 and the cathode 22. Through this, a discharge may occur between the anode 21 and the cathode 22 at the timing at which the pulsed laser light 32 passes through the discharge space 23 in the amplification device 3.

Part of the pulsed laser light 32 emitted by the low-coherence optical system 4 may pass through the output coupler 14 and reflect off the high-reflection mirror 15. This pulsed laser light 32 may then pass through the window 18 and advance into the discharge space 23 between the anode 21 and the cathode 22. The pulsed laser light 32 may be amplified by carrying out control so that a discharge occurs in the discharge space 23 when the pulsed laser light 32 is present in the discharge space 23. The amplified pulsed laser light 32 may be emitted from the chamber 20 through the window 19. The emitted pulsed laser light 32 may be highly reflected by the high-reflection mirrors 16 and 17, and may then once again advance into the discharge space 23 within the chamber 20 via the window 19. This pulsed laser light 32 may then be emitted from the chamber 20 through the window 18. The emitted pulsed laser light 32 may then be incident on the output coupler 14. Part of the pulsed laser light 32 may pass through the output coupler 14 and be emitted from the amplification device 3 as the pulsed laser light 33. Another part of the pulsed laser light 32 may be returned to the ring optical resonator as feedback light by being reflected by the output coupler 14.

Although the amplification device 3 including a ring optical resonator is mentioned as an example in these descriptions, the disclosure is not limited thereto. For example, the amplification device 3 may include a Fabry-Perot resonator in which an optical resonator is provided in an amplifier.

4. Master Oscillator with Optical Shutter Disposed within Optical Path

Second Embodiment

Figure 2:
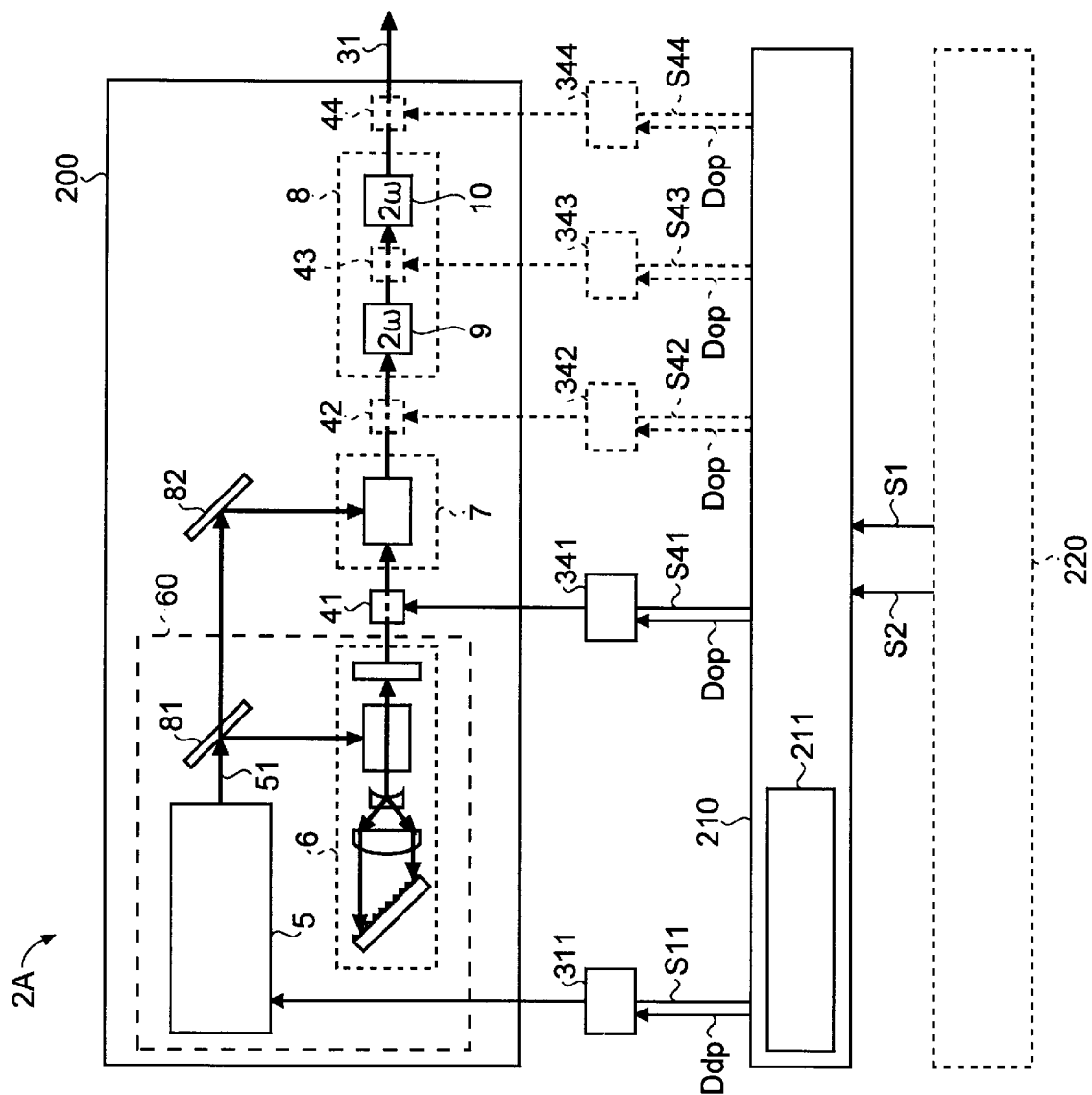
FIG. 2 schematically illustrates a master oscillator according to a second embodiment of this disclosure.

Next, another embodiment of the master oscillator 2 illustrated in FIG. 1 will be described in detail with reference to the drawings, as a second embodiment of this disclosure.
4.1 Configuration
FIG. 2 schematically illustrates a master oscillator 2A according to the second embodiment of this disclosure. As shown in FIG. 2, the master oscillator 2A may include a solid-state laser device 200 and a controller 210. The master oscillator 2A may also include one or more delay circuits that delay various types of signals inputted from the controller 210 to the solid-state laser device 200 in order to carry out timing adjustments.

The solid-state laser device 200 may include, as described above, the pumping laser 5, the Ti:sapphire laser 6 (a seed laser), the amplifier 7, a wavelength conversion unit 8 that includes the LBO crystal 9 and the KBBF crystal 10, the beam splitter 81, and the high-reflection mirror 82. A long-pulse master oscillator 60 may be constituted by the pumping laser 5, the Ti:sapphire laser 6, and the beam splitter 81. The long-pulse master oscillator 60 may, for example, generate pulsed laser light having a pulse width (time length) that is sufficiently greater than the jitter of the rise timing (in other words, having a long round-trip time). Such a long-pulse master oscillator 60 can be realized by lengthening the resonator length, increasing the OC reflectance, reducing the gain of the laser medium, and so on.

The solid-state laser device 200 may further include at least one optical shutter. An optical shutter 41 may be disposed in the optical path between the Ti:sapphire laser 6 and the amplifier 7. An optical shutter 42 may be disposed in the optical path between the amplifier 7 and the wavelength conversion unit 8. An optical shutter 43 may be disposed in the optical path between the LBO crystal 9 and the KBBF crystal 10. An optical shutter 44 may be disposed at the output end of the master oscillator 2A. The optical shutters 41 through 44 may have identical configurations and may operate in identical ways. Alternatively, the configurations and operations of the optical shutters 41 through 44 may be different from one another.

The controller 210 may be a synchronization control device that controls the timing at which the pumping laser 5 outputs the pumping light 51, the timing at which the optical shutters 41 through 44 open and close, and so on. Such a controller 210 may include an internal trigger oscillator 211. The internal trigger oscillator 211 may, for example, oscillate an internal trigger at a predetermined repetition rate. The controller 210 may transmit this internal trigger to the pumping laser 5 as a pumping laser oscillation signal S11.

In addition, the controller 210 may, for example, receive a trigger signal S1 at an approximately predetermined repetition rate from an external device 220 that serves as a higher-level controller, such as a laser controller or the like. The controller 210 may transmit the pumping laser oscillation signal S11 to the pumping laser 5 based on the trigger signal S1 received from the external device 220. Through this, the pumping laser 5 can continuously output the pumping light 51 at the approximately predetermined repetition rate. The controller 210 may transmit optical shutter operation signals S41 through S44 to the respective optical shutters 41 through 44.

The delay circuit may include an oscillation delay circuit 311 and first through fourth shutter delay circuits 341 through 344. The oscillation delay circuit 311 may delay the pumping laser oscillation signal S11 that oscillates the pumping laser 5 by a predetermined delay time (an oscillation delay time Ddp). The first through fourth shutter delay circuits 341 through 344 may delay the optical shutter operation signals S41 through S44 to the respective optical shutters 41 through 44 by a predetermined delay time calculated for each of the optical shutters 41 through 44 (a shutter delay time Dop). It is preferable for the delay times of the oscillation delay circuit 311 and the first through fourth shutter delay circuits 341 through 344 to be capable of being set from an external device.

4.1.1 Optical Shutter

Figure 3:
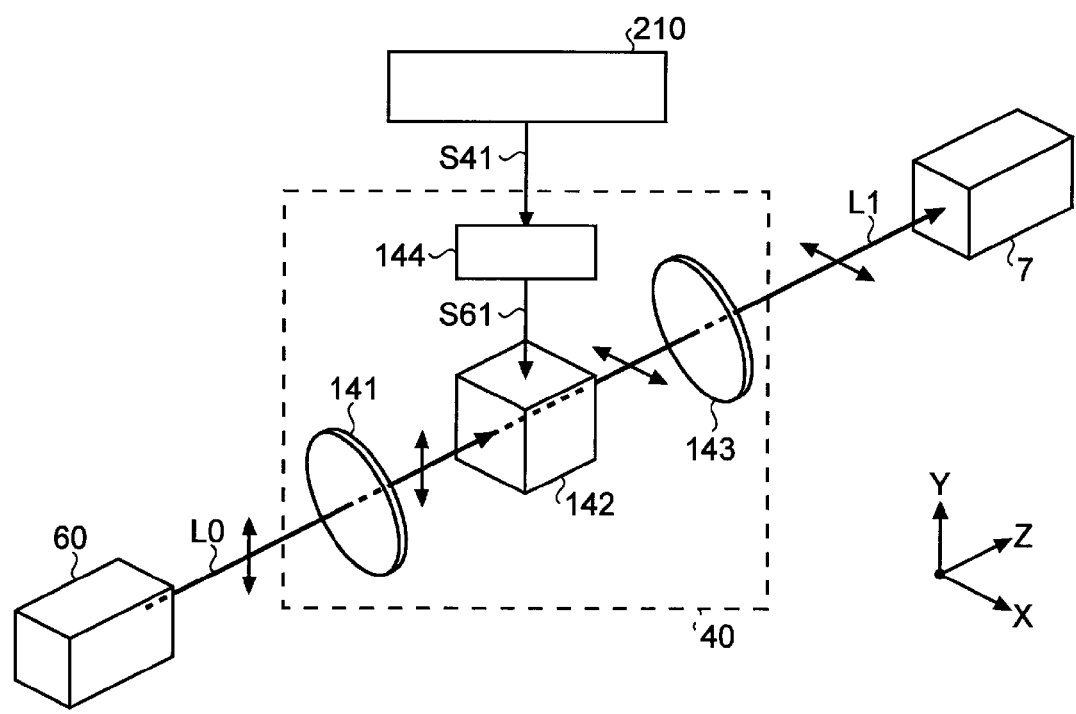
FIG. 3 illustrates an example of an optical shutter according to the second embodiment.

FIG. 3 illustrates an example of an optical shutter according to the second embodiment. Note that an optical shutter 40 illustrated in FIG. 3 may be applied as any of the optical shutters 41 through 44. In FIG. 3, the optical shutter 41 is used as an example.

As shown in FIG. 3, the optical shutter 40 may include, for example, two polarizers 141 and 143, a Pockels cell 142, and a high-voltage power source 144. The polarizer 141 may transmit, for example, a Y-direction polarized component of the incident light and block an X-direction polarized component of the light. On the other hand, the polarizer 143 may transmit, for example, an X-direction polarized component of the incident light and block a Y-direction polarized component of the light. In this manner, the polarizer 141 and the polarizer 143 transmit different polarized components of the light. For example, the polarization direction of the transmitted light may differ by approximately 90° between the polarizer 141 and the polarizer 143, as in this example.

An optical shutter operation signal S41 may be inputted into the high-voltage power source 144 of the optical shutter 40. When the high-voltage power source 144 receives the optical shutter operation signal S41, the high-voltage power source 144 may apply a voltage S61 to the Pockels cell 142. The voltage S61 may have a pulse width (time length) that is substantially the same as the pulse width of the optical shutter operation signal S41. The Pockels cell 142 can, for example, change the polarization direction of inputted light during the period in which the voltage S61 is being applied. In this example, the voltage S61 having a voltage value that changes the polarization direction of the inputted light by approximately 90° may be applied to the Pockels cell 142 by the high-voltage power source 144.

Pulsed laser light L0 that enters the optical shutter 40 from the long-pulse master oscillator 60 may first be incident on the polarizer 141. The polarizer 141 may transmit the Y-direction linearly-polarized component of the inputted pulsed laser light L0 (called "Y linearly-polarized pulsed laser light" hereinafter). The Y linearly-polarized pulsed laser light that has passed through the polarizer 141 enters the Pockels cell 142.

When the voltage S61 is not applied to the Pockels cell 142, the Y linearly-polarized pulsed laser light that has entered the Pockels cell 142 is outputted from the Pockels cell 142 as Y-direction linearly-polarized light without having its polarization direction changed, and is incident on the polarizer 143. Accordingly, the Y linearly-polarized pulsed laser light that has passed through the Pockels cell 142 is reflected and absorbed by the polarizer 143. As a result, the pulsed laser light L0 is blocked by the optical shutter 40.

On the other hand, when the voltage S61 is being applied to the Pockels cell 142, the polarization direction of the Y linearly-polarized pulsed laser light that has entered the Pockels cell 142 can be changed by approximately 90°. As a result, X-direction linearly-polarized pulsed laser light (called "X linearly-polarized pulsed laser light" hereinafter) can be outputted from the Pockels cell 142. This X linearly-polarized pulsed laser light passes through the polarizer 143. As a result, pulsed laser light L1 is outputted from the optical shutter 40.

Figure 4:
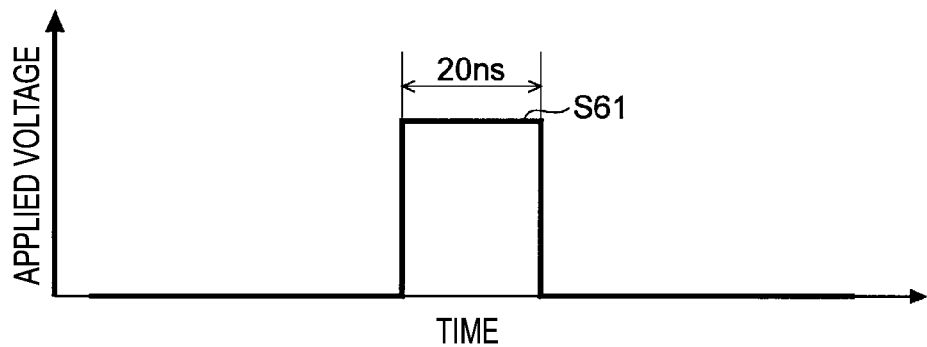
FIG. 4 illustrates an example of a high-voltage pulse applied to a Pockels cell according to the second embodiment.
Figure 5:
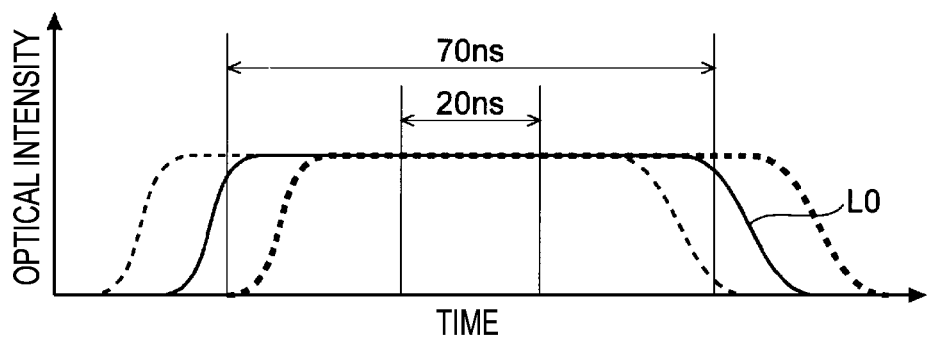
FIG. 5 illustrates an example of pulsed laser light outputted from a long-pulse master oscillator according to the second embodiment.
Figure 6:
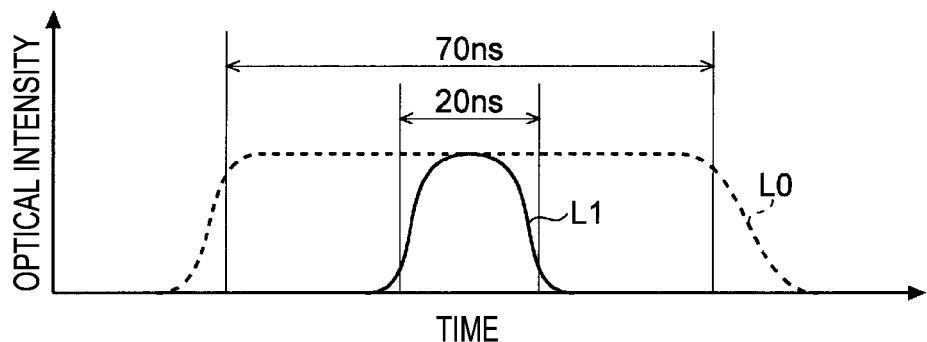
FIG. 6 illustrates an example of pulsed laser light that has passed through the optical shutter according to the second embodiment.

In addition, assuming that, for example, the required pulse width (time length) for the pulsed laser light L1 is approximately 20 ns, it is preferable, for example, to apply a voltage S61 having a pulse width (time length) of approximately 20 ns to the Pockels cell 142, as shown in FIG. 4. Meanwhile, as described above, pulsed laser light having, for example, a pulse width (time length) that is sufficiently greater than the jitter of the rise timing may be outputted from the long-pulse master oscillator 60. Assuming that the jitter of the rise timing is approximately ±10 ns and that the required pulse width (time length) for the pulsed laser light L1 is approximately 20 ns as shown in FIG. 5, it is preferable for the long-pulse master oscillator 60 to output the pulsed laser light L0 having a pulse width (time length) of approximately 70 ns. Through this, as shown in FIG. 6, the pulsed laser light L1 having a pulse width of approximately 20 ns may be outputted from the optical shutter 40, at a timing that is not affected by the jitter in the rise timing of the pulsed laser light L0. Since a typical Pockels cell has a responsiveness of several nanoseconds, a Pockels cell is suitable in optical shutters for laser systems in which high-speed switching is demanded.

Note that the present example is a configuration in which the polarization directions of the pulsed laser light L0 that has passed through the polarizer 141 and the pulsed laser light L1 that has passed through the polarizer 143 have been changed by approximately 90°. For this reason, the optical shutter 40 is in an open state while the voltage S61 is applied to the Pockels cell 142. However, the scope of this disclosure is not limited to this example. For example, the pulsed laser light L0 that has passed through the polarizer 141 and the pulsed laser light L1 that has passed through the polarizer 143 may be polarized in the same direction. In this case, the optical shutter 40 is in an open state while a voltage is not applied to the Pockels cell 142. Note that an optical shutter being in an "open state" refers to putting the optical shutter in a state in which pulsed laser light can pass therethrough, whereas an optical shutter being in a "closed state" refers to putting the optical shutter in a state in which pulsed laser light is blocked by the optical shutter.

4.2 Operations

Next, an overview of operations performed by the master oscillator 2A according to the second embodiment will be described with reference to the flowchart shown in FIG. 7. Note that these descriptions will focus on operations performed by the controller 210.

Figure 7:
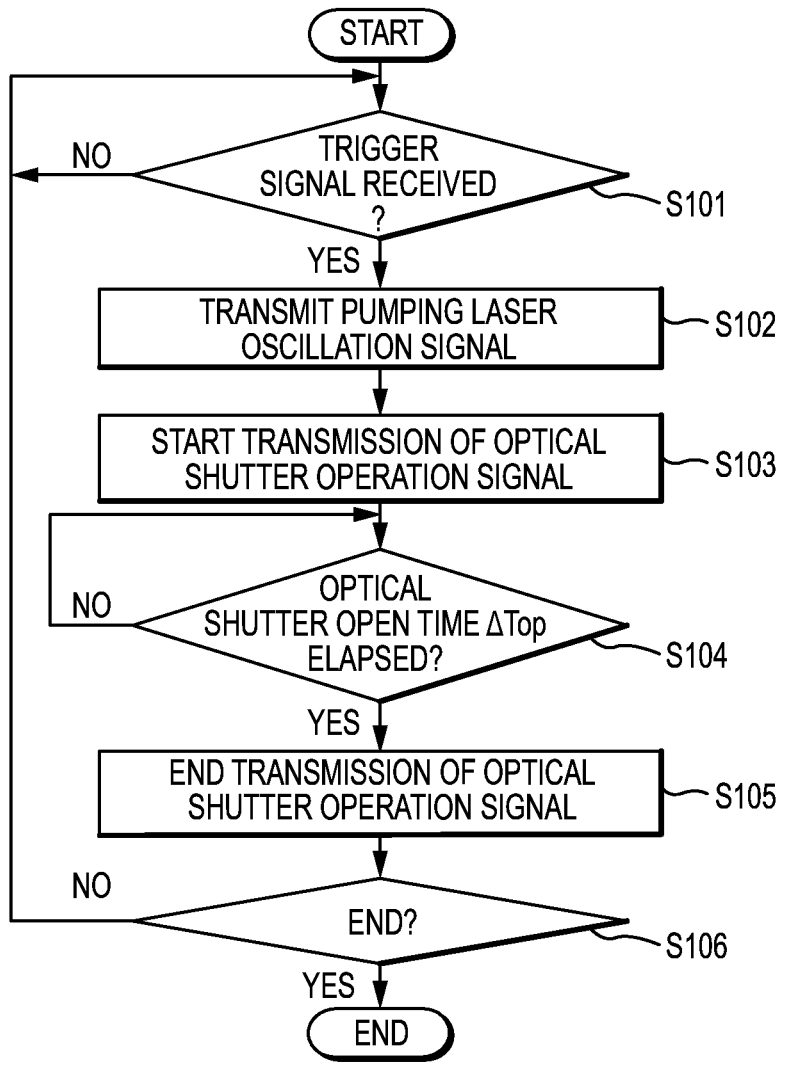
FIG. 7 is a flowchart schematically illustrating operations carried out by the master oscillator according to the second embodiment.

As shown in FIG. 7, the controller 210 may stand by until the trigger signal S1 is received from the external device 220, such as, for example, a laser controller or the like (step S101; NO). Note that the controller 210 may transmit the internal trigger oscillated by the internal trigger oscillator 211 to the pumping laser 5 as the pumping laser oscillation signal S11 while the trigger signal S1 is not inputted from the external device 220.

When the trigger signal S1 is received (step S101; YES), the controller 210 may transmit the pumping laser oscillation signal S11 to the pumping laser 5 (step S102). The controller 210 may also start transmitting the optical shutter operation signals S41 through S44 to the respective optical shutters 41 through 44 (step S103). The pumping laser oscillation signal S11 may be inputted to the pumping laser 5 through the oscillation delay circuit 311. The optical shutter operation signals S41 through S44 may be inputted to the respective optical shutters 41 through 44 through the respective first through fourth shutter delay circuits 341 through 344. The oscillation delay circuit 311 may be set so as to delay the pumping laser oscillation signal S11 by the oscillation delay time Ddp. The first through fourth shutter delay circuits 341 through 344 may be set with the shutter delay times Dop based on the respective optical shutters 41 through 44, so that the respective optical shutters 41 through 44 open and close in accordance with the timing at which the pulsed laser light passes therethrough. Through this, the timing at which the pumping light 51 is outputted from the pumping laser 5 and the timing at which the respective optical shutters 41 through 44 open and close may be adjusted. Note that the timing at which the pumping light 51 is outputted from the pumping laser 5 may be directly related to the timing at which the pulsed laser light L0 is outputted from the Ti:sapphire laser 6.

Thereafter, the controller 210 may measure the time that has elapsed after the start of the transmission of the respective optical shutter operation signals S41 through S44 using, for example, a timer or the like (not shown). The controller 210 may then stand by until this measured time exceeds or reaches a pre-set optical shutter open time ΔTop (step S104; NO). Note that the optical shutter open time ΔTop is the time at which the optical shutters 41 through 44 enter an open state.

When the optical shutter open time ΔTop has elapsed (step S104; YES), the controller 210 may end the transmission of the optical shutter operation signals S41 through S44 (step S105). Through this, the optical shutters 41 through 44 may enter a closed state. As described above, with the use of the long-pulse master oscillator 60, the waveform of the pulsed laser light L1 may be adjusted through the opening and closing operations of the optical shutters 41 through 44.

Thereafter, the controller 210 may determine whether or not to end the laser oscillation (step S106). When the laser oscillation is to be ended (step S106; YES), the controller 210 may end the present operations. Note that when the trigger signal 51 is not received from the external device 220 at the predetermined repetition rate after the present operations have ended, the controller 210 may transmit the internal trigger oscillated by the internal trigger oscillator 211 to the pumping laser 5 at a predetermined repetition rate as the pumping laser oscillation signal S11. On the other hand, when the present operations are not to be ended (step S106; NO), the controller 210 may return to step S101 and execute the subsequent processes.

4.3 Effects

By employing a configuration and operations as described thus far, the pulsed laser light L1 outputted from the optical shutters 41 through 44 may take on a pulse shape cut out from the pulsed laser light L0 or L1 by the optical shutter operation signals S41 through S44 supplied to the respective optical shutters 41 through 44. In this manner, the pulsed laser light L1 may be controlled by the optical shutter operation signals S41 through S44 supplied to the respective optical shutters 41 through 44. For this reason, jitter in the pulsed laser light L1 can become circuit jitter in the high-voltage power source 144 that applies the voltage S61 to the Pockels cell 142. It is believed that such circuit jitter is sufficiently short relative to the jitter of the pulsed laser light L0 outputted from the long-pulse master oscillator 60. Therefore, it is believed that the jitter in the pulsed laser light L1 that has passed through the optical shutters 41 through 44 is low enough to be ignored.

The master oscillator 2A can control the pulse width using the optical shutters 41 through 44. Accordingly, it is also possible to change the pulse width with ease.

5. Laser System Including Master Oscillator Having Optical Shutter and Amplification Device

Third Embodiment

Next, a laser system 1A in which the master oscillator 2A according to the second embodiment and the amplification device 3 have been combined will be described in detail as a third embodiment.

5.1 Configuration

Figure 8:
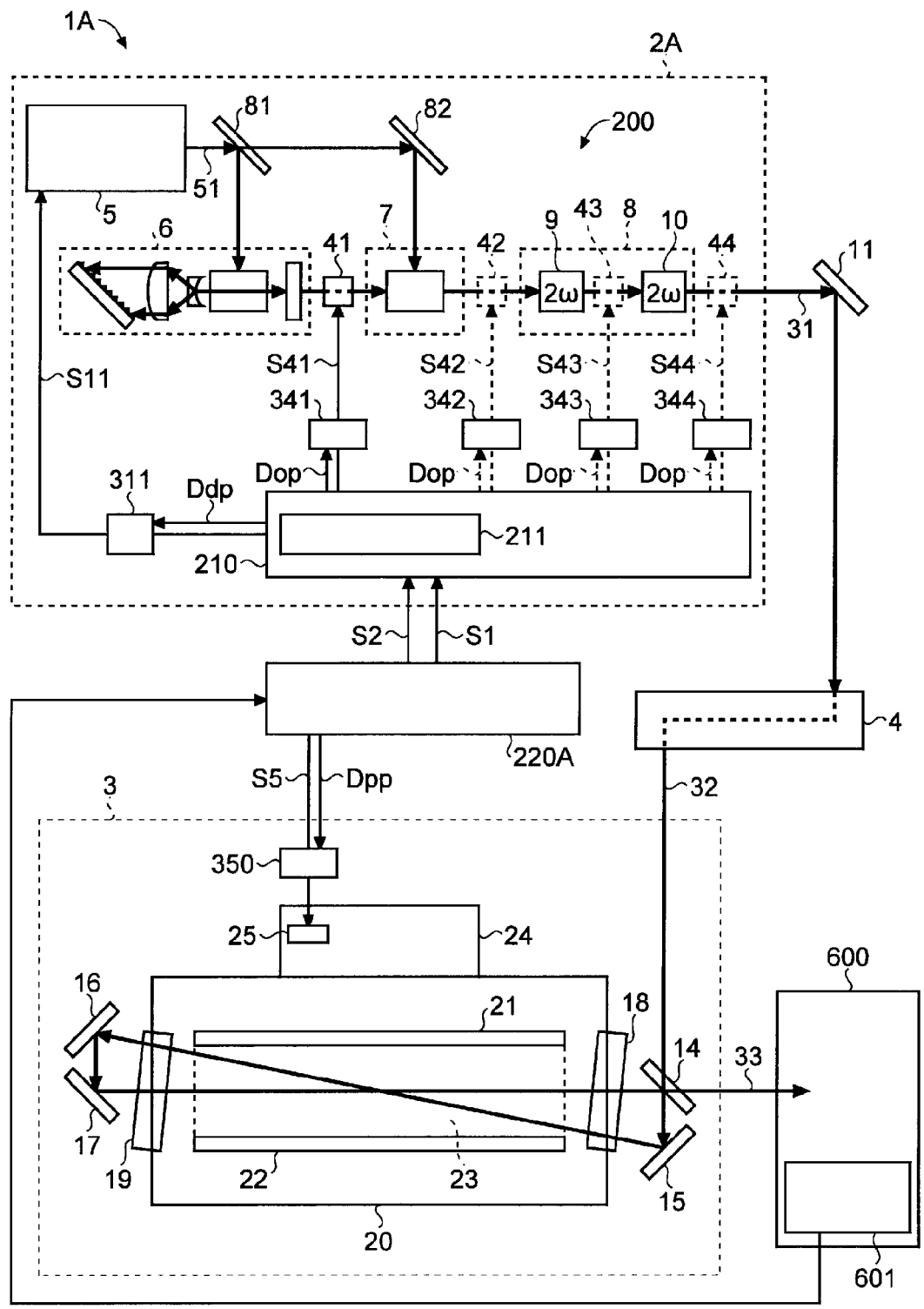
FIG. 8 schematically illustrates a laser system according to a third embodiment of this disclosure.

FIG. 8 schematically illustrates the laser system 1A according to the third embodiment. As shown in FIG. 8, the laser system 1A includes the master oscillator 2A according to the second embodiment, the high-reflection mirror 11, the low-coherence optical system 4, a laser controller 220A that controls the overall operations of the laser system 1A, and the amplification device 3. In addition, the amplification device 3 of the laser system 1A may include a laser power source 24 that is electrically connected to the anode 21 and the cathode 22 in the chamber 20. Furthermore, the amplification device 3 may include a switch delay circuit 350 that delays a switch signal S5 outputted from the laser controller 220A by a predetermined delay time (a switch delay time Dpp).

5.2 Operations

Next, an overview of operations performed by the laser system 1A will be given. The laser controller 220A is an example of the aforementioned external device 220. When burst output of the pulsed laser light 33 is requested by an exposure controller 601 in an exposure apparatus 600, the laser controller 220A inputs the trigger signal S1 and a burst request signal S2 to the controller 210 of the master oscillator 2A. The controller 210 generates burst output of the pulsed laser light 31 by executing the aforementioned operations in accordance therewith.

Meanwhile, the laser controller 220A outputs a discharge signal of a predetermined repetition rate to the laser power source 24 of the amplification device 3. The laser controller 220A may output the discharge signal continuously, or may output the discharge signal only during a period in which burst output is being requested by the exposure controller 601. When a switch 25 of the laser power source 24 is turned on by the discharge signal, the laser power source 24 applies a potential difference for a discharge between the anode 21 and the cathode 22. As a result, a discharge occurs in the discharge space 23 between the anode 21 and the cathode 22.

Furthermore, upon outputting the trigger signal S1 to the controller 210, the laser controller 220A outputs the switch signal S5 to the switch 25 of the laser power source 24. The switch signal S5 is inputted to the switch 25 via the switch delay circuit 350. As a result, a discharge occurs in the discharge space 23 in correspondence with the timing at which the pulsed laser light 32, which has entered the amplification device 3 from the master oscillator 2A through the low-coherence optical system 4, passes through the chamber 20. It is preferable to specify the switch delay time Dpp implemented by the switch delay circuit 350 in advance, through experience, experiments, simulations, or the like.

5.3 Timing Chart

Next, operations performed by the laser system 1A will be described with reference to the timing chart shown in FIG. 9. Note that here, the optical shutters 42 through 44 have been omitted for the sake of simplicity.

Figure 9:
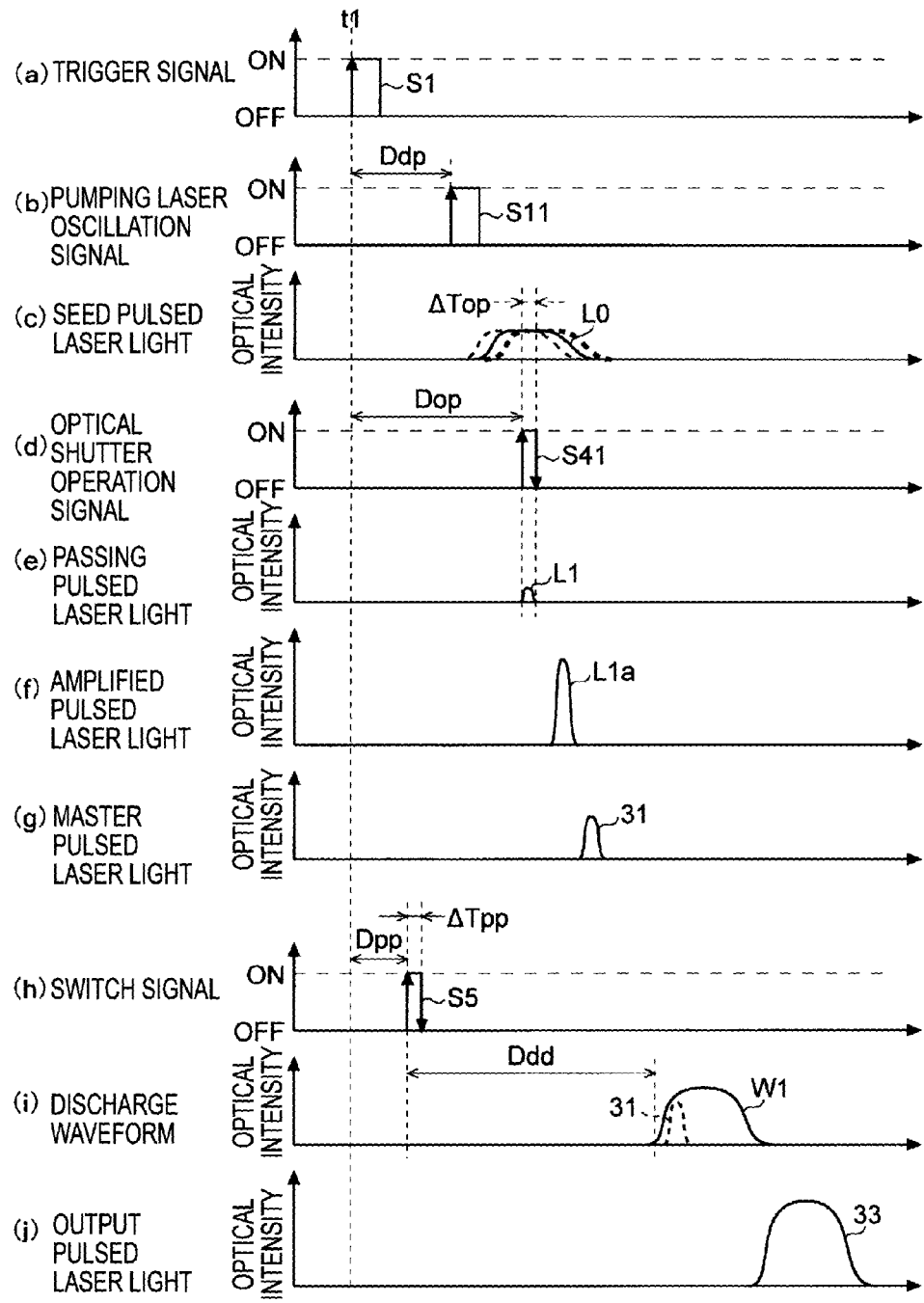
FIG. 9 is a timing chart illustrating the overall operations performed by the laser system according to the third embodiment.

As shown in FIG. 9(*a*), the laser controller 220A may output the trigger signal S1 to the controller 210 at, for example, a timing t1. Then, the controller 210 may output the pumping laser oscillation signal S11 to the pumping laser 5. The pumping laser oscillation signal S11 may be inputted to the pumping laser 5 having been delayed with respect to the trigger signal S1 by the oscillation delay time Ddp through the use of the oscillation delay circuit 311, as shown in FIG. 9(*b*). As a result, the pulsed laser light (here, for explanatory purposes, this will be called "seed pulsed laser light") L0 may be outputted from the long-pulse master oscillator 60. The seed pulsed laser light L0 may enter the optical shutter 41 at, for example, the timing illustrated in FIG. 9(*c*).

In addition, upon receiving the trigger signal S1 (see FIG. 9(*a*)), the controller 210 may output the optical shutter operation signal S41, which has a pulse width equivalent to the optical shutter open time ΔTop, to the optical shutter 41. As shown in FIG. 9(d), the optical shutter operation signal S41 may be inputted to the optical shutter 41 having been delayed, through the first shutter delay circuit 341, by the shutter delay time Dop relative to the trigger signal S1, so as to match the period in which the seed pulsed laser light L0 passes through the optical shutter 41. As a result, as shown in FIG. 9(e), pulsed laser light cut out from the seed pulsed laser light L0 in accordance with the optical shutter open time ΔTop (here, for explanatory purposes, this will be called "passing pulsed laser light") L1 may be outputted from the optical shutter 41. This passing pulsed laser light L1 may then be amplified by passing through the amplifier 7, as shown in FIG. 9(f) (here, for explanatory purposes, this will be called "amplified pulsed laser light L1a"). Thereafter, the amplified pulsed laser light L1a may be converted into a higher-harmonic pulsed laser light by passing through the wavelength conversion unit 8, and may then be outputted from the master oscillator 2A (here, for explanatory purposes, which will be called "master pulsed laser light 31").

Meanwhile, upon receiving the trigger signal S1 (see FIG. 9(a)), the controller 210 may output the switch signal S5, which has a pulse width equivalent to a switch-on time ΔTpp, to the switch 25 in the laser power source 24 of the amplification device 3. As shown in FIG. 9(h), the switch signal S5 may be inputted to the switch 25 having been delayed by the switch delay time Dpp relative to the trigger signal S1 having been delayed by the switch delay circuit 350. Then, as shown in FIG. 9(i), the amplification device 3 may cause a discharge in the discharge space 23 within the chamber 20 at a timing delayed more than an input timing Tpp of the switch signal S5 by a delay time Ddd (a discharge waveform W1). It is preferable to set at least one of the shutter delay time Dop and the switch delay time Dpp so that the discharge period indicated by the discharge waveform W1 matches the period in which the master pulsed laser light 32 that has passed through the low-coherence optical system 4 passes through the discharge space 23. As a result, as shown in FIG. 9(j), amplified pulsed laser light (here, for explanatory purposes, this will be called "output pulsed laser light") 33 may be outputted from the amplification device 3.

5.4 Flowcharts

Figure 10:
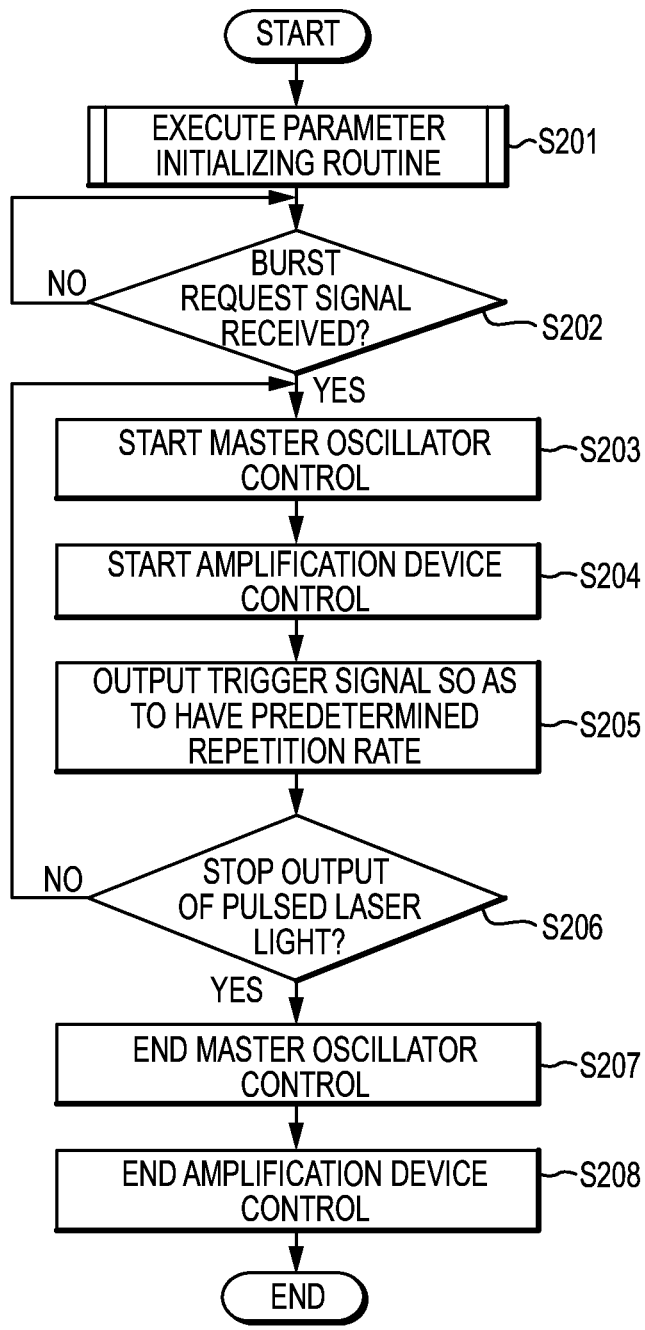
FIG. 10 is a flowchart schematically illustrating the operations performed by the laser system according to the third embodiment.
Figure 11:
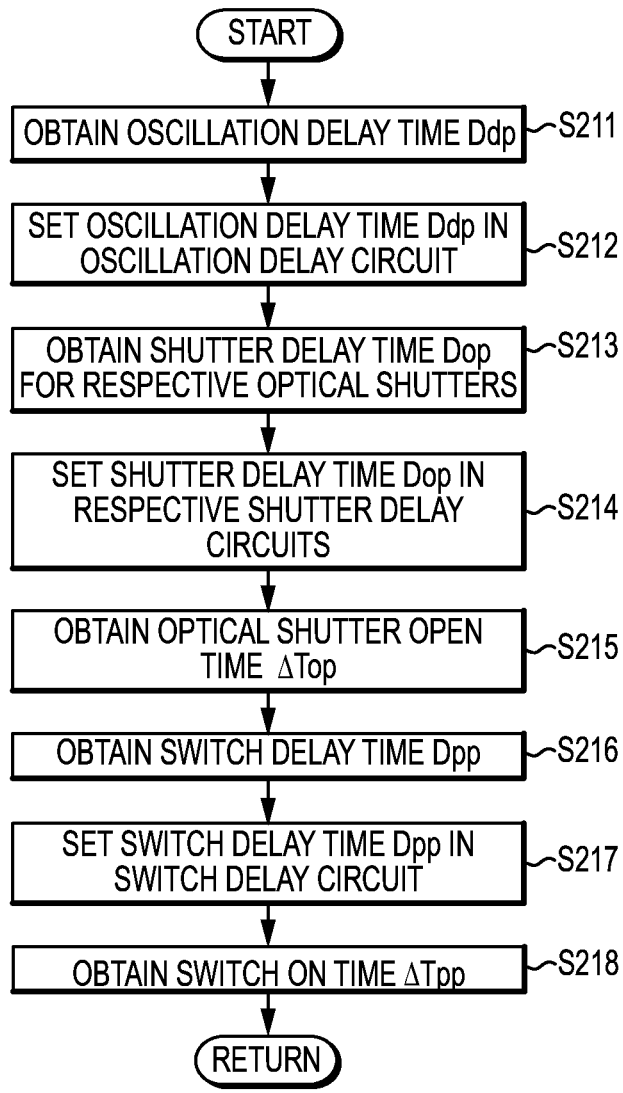
FIG. 11 is a flowchart schematically illustrating the operations in a parameter initializing routine, indicated in step S201 of FIG. 10.
Figure 12:
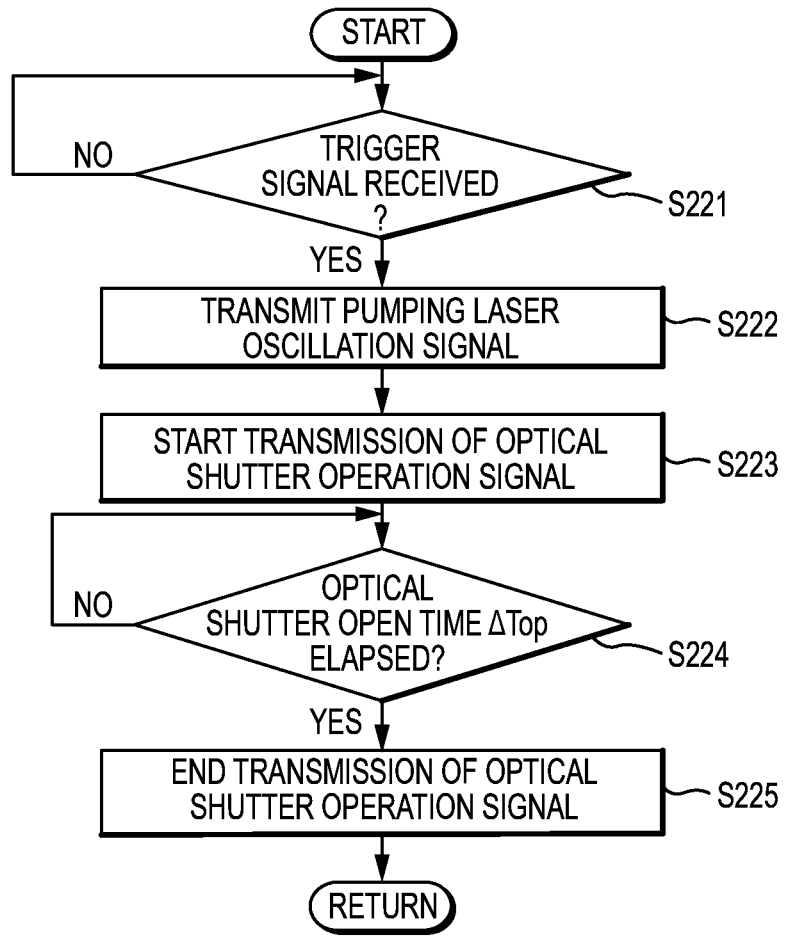
FIG. 12 is a flowchart illustrating operations executed by a controller, indicated in step S203 of FIG. 10.
Figure 13:
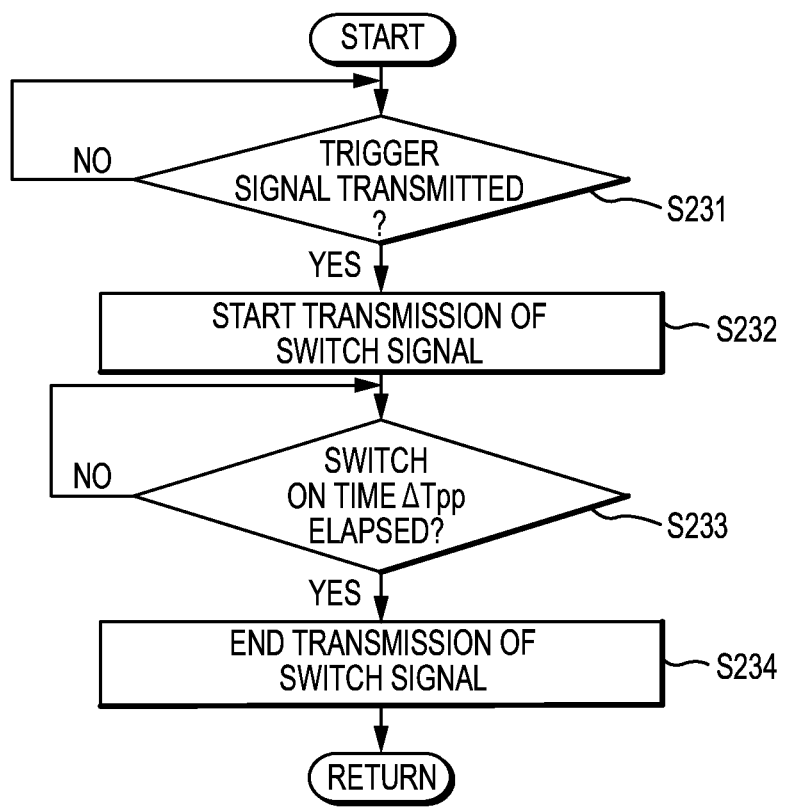
FIG. 13 is a flowchart schematically illustrating the operations in an amplification device control routine, indicated in step S204 of FIG. 10.

Next, operations of the laser system 1A will be described with reference to flowcharts. FIG. 10 is a flowchart illustrating an overview of operations of the laser system 1A. FIG. 11, meanwhile, is a flowchart illustrating an overview of operations performed in a parameter initializing routine, indicated in step S201 of FIG. 10. FIG. 12 is a flowchart illustrating operations started by the controller in step S203 indicated in FIG. 10. FIG. 13 is a flowchart illustrating operations started by the laser controller in step S204 of FIG. 10. Note that FIG. 10, FIG. 11, and FIG. 13 indicate operations performed by the laser controller 220A. FIG. 12, meanwhile, indicates operations performed by the controller 210.

As shown in FIG. 10, after starting up, the laser controller 220A may execute a parameter initializing routine that initializes various parameters (step S201). Note that the initial parameters to be set may be recorded in advance, or may be inputted or requested from the exterior, such as from the exposure controller 601.

Next, the laser controller 220A may stand by until a burst request signal requesting a burst of the pulsed laser light 33 is received from the exposure controller 601 or the like (step S202; NO). When the burst request signal is received (step S202; YES), the laser controller 220A may execute control causing the master oscillator 2A to output a burst of the pulsed laser light 31 (step S203). Along with this, the laser controller 220A may execute control causing the amplification device 3 to perform a discharge (step S204).

Next, the laser controller 220A may output the trigger signal S1 to the controller 210 so as to achieve a predetermined repetition rate for the trigger signal S1 (step S205). Thereafter, the laser controller 220A may determine whether or not to stop the output of the pulsed laser light 33 (step S206). When the output is to be stopped (step S206; YES), the laser controller 220A may end the control of the master oscillator 2A started in step S203 (step S207). In addition, the laser controller 220A may end the control of the amplification device 3 started at step S204 (step S208), and thereafter, may end the present operations. On the other hand, when the output is not to be stopped (step S206; NO), the laser controller 220A may return to step S203 and execute the operations that follow thereafter.

Next, an overview of the operations in the parameter initializing routine indicated in step S201 of FIG. 10 will be described. As shown in FIG. 11, in the parameter initializing routine, the laser controller 220A may obtain the oscillation delay time Ddp set in the oscillation delay circuit 311 (step S211). The obtained oscillation delay time Ddp may be a default value stored in advance in a memory or the like (not shown), or may be a value newly calculated by the laser controller 220A. Continuing on, the laser controller 220A may set the obtained oscillation delay time Ddp in the oscillation delay circuit 311 via the controller 210 (step S212). Through this, the timing of the pumping laser oscillation signal S11 that passes through the oscillation delay circuit 311 may be delayed by an amount equivalent to the oscillation delay time Ddp.

Next, the laser controller 220A may obtain the shutter delay time Dop set in the respective optical shutters 41 through 44 (step S213). The obtained shutter delay time Dop may be a default value stored in advance in a memory or the like (not shown), or may be a value newly calculated by the laser controller 220A. Next, the laser controller 220A may set the obtained shutter delay time Dop for the respective optical shutters 41 through 44 in the respective first through fourth shutter delay circuits 341 through 344 via the controller 210 (step S214). Through this, the timings of the optical shutter operation signals S41 through S44 that pass through the respective first through fourth shutter delay circuits 41 through 44 may be delayed by an amount equivalent to the shutter delay time Dop.

Next, the laser controller 220A may obtain the optical shutter open time ΔTop for the respective optical shutters 41 through 44 (step S215). The obtained optical shutter open time ΔTop may be a default value stored in advance in a memory or the like (not shown), or may be a value newly calculated by the laser controller 220A.

Next, the laser controller 220A may obtain the switch delay time Dpp set in the switch delay circuit 350 (step S216). The obtained switch delay time Dpp may be a default value stored in advance in a memory or the like (not shown), or may be a value newly calculated by the laser controller 220A. Then, the laser controller 220A may set the obtained switch delay time Dpp in the switch delay circuit 350 (step S217). Through this, the timing of the switch signal S5 that passes through the switch delay circuit 350 may be delayed by an amount equivalent to the switch delay time Dpp.

When the various parameters have been initialized as described thus far, the laser controller 220A may then return to the operations illustrated in FIG. 10.

Next, operations executed by the controller 210 in step S203 indicated in FIG. 10 will be described. As shown in FIG. 12, under the control of the laser controller 220A, the controller 210 may stand by until, for example, the trigger signal S1 is received from the laser controller 220A (step S221; NO). Note that the controller 210 may transmit the internal trigger oscillated by the internal trigger oscillator 211 to the pumping laser 5 as the pumping laser oscillation signal S11 at a predetermined repetition rate while the trigger signal S1 is not being inputted from the laser controller 220A.

When the trigger signal 51 is received (step S221; YES), the controller 210 may transmit the pumping laser oscillation signal S11 to the pumping laser 5 (step S222). The controller 210 may also start transmitting the optical shutter operation signals S41 through S44 to the respective optical shutters 41 through 44 (step S223). The pumping laser oscillation signal S11 may be inputted to the pumping laser 5 through the oscillation delay circuit 311. The optical shutter operation signals S41 through S44 may be inputted to the respective optical shutters 41 through 44 through the respective first through fourth shutter delay circuits 341 through 344. The oscillation delay circuit 311 may be set so as to delay the pumping laser oscillation signal S11 by the oscillation delay time Ddp. The first through fourth shutter delay circuits 341 through 344 may be set with the shutter delay times Dop for each of the optical shutters 41 through 44, so that the respective optical shutters 41 through 44 open and close in accordance with the timing at which the pulsed laser light passes therethrough. Through this, the timing at which the pumping light 51 is outputted from the pumping laser 5 and the timing at which the respective optical shutters 41 through 44 open and close may be adjusted. Note that the timing at which the pumping light 51 is outputted from the pumping laser 5 may be directly related to the timing at which the pulsed laser light L0 is outputted from the Ti:sapphire laser 6.

Thereafter, the controller 210 may measure the time that has elapsed after the start of the transmission of the respective optical shutter operation signals S41 through S44 using, for example, a timer or the like (not shown). The controller 210 may then stand by until this measured time exceeds or reaches a pre-set optical shutter open time ΔTop (step S224; NO).

When the optical shutter open time ΔTop has elapsed (step S224; YES), the controller 210 may end the transmission of the optical shutter operation signals S41 through S44 (step S225). Through this, the optical shutters 41 through 44 may enter a closed state. Note that as described above, using the long-pulse master oscillator 60 may make it possible to adjust the waveform of the pulsed laser light L1, through the opening and closing operations of the optical shutters 41 through 44.

Thereafter, the controller 210 may determine whether or not to end the present operations (step S226). When the present operations are to be ended (step S226; YES), the controller 210 may end the present operations. On the other hand, when the present operations are not to be ended (step S226; NO), the controller 210 may return to step S221 and execute the subsequent processes.

Operations started by the laser controller 220A in step S204 of FIG. 10 will now be described. As shown in FIG. 13, the laser controller 220A may stand by until the trigger signal S1 is outputted to the controller 210 at a predetermined repetition rate (step S231; NO). When the trigger signal S1 is outputted (step S231; YES), the laser controller 220A may start the transmission of the switch signal S5 to the switch 25 (step S232). The switch signal S5 may be inputted to the switch 25 through the switch delay circuit 350. The switch delay time Dpp may be set in the switch delay circuit 350 so that a discharge occurs in the discharge space 23 in correspondence with the timing at which the pulsed laser light 32 that has transmitted through the low-coherence optical system 4 passes through the discharge space 23.

Thereafter, the laser controller 220A may measure the time that has elapsed after the start of the transmission of the switch signal S5 using, for example, a timer or the like (not shown). The laser controller 220A may then stand by until the measured time exceeds or reaches the pre-set switch-on time ΔTpp (step S233; NO).

When the switch-on time ΔTpp has elapsed (step S233; YES), the laser controller 220A may end the transmission of the switch signal S5 (step S234). Through this, the period in which a discharge occurs in the discharge space 23 may be adjusted. Thereafter, the laser controller 220A may return to the operations indicated in FIG. 10.

5.5 Effects

According to the third embodiment, it is possible to synchronize the operational timing of the optical shutters 41 through 44 disposed within the master oscillator 2A with the timing at which the amplification device 3 that is filled with the laser gas is caused to operate (discharge), without being affected by the time jitter of the pumping laser 5, the Ti:sapphire laser 6, and so on. Thus, a stable pulsed laser light 33 can be generated.

6. Additional Descriptions

Figure 14:
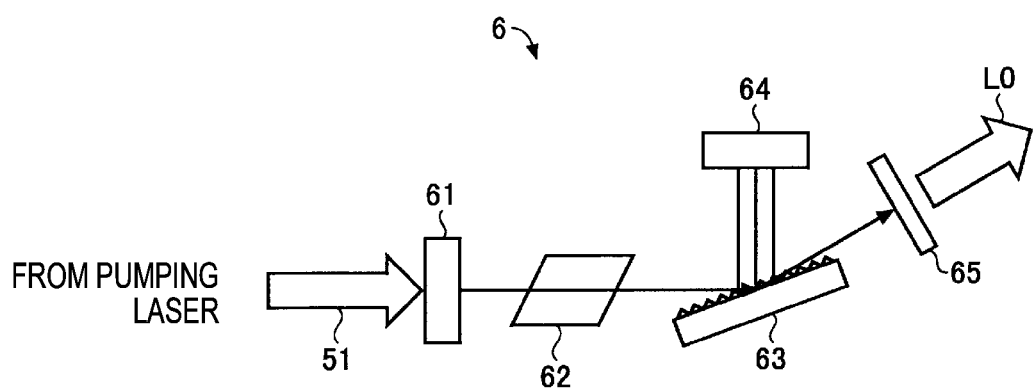
FIG. 14 illustrates an example of a Ti:sapphire laser according to the first through third embodiments.

Next, additional descriptions of the various portions described in the aforementioned embodiments will be given.
6.1 Ti:sapphire Laser FIG. 14 illustrates an example of the aforementioned Ti:sapphire laser 6. As shown in FIG. 14, the Ti:sapphire laser 6 may be what is known as a Littman-type laser. The Ti:sapphire laser 6 includes a high-reflection mirror 61, an output coupler 65, a Ti:sapphire crystal 62, a grating 63, and a high-reflection mirror 64. The high-reflection mirror 61 and the output coupler 65 jointly form an optical resonator. The Ti:sapphire crystal 62 and the grating 63 are disposed in the optical path of this optical resonator. The high-reflection mirror 64 reflects laser light diffracted by the grating 63 back toward the grating 63. The high-reflection mirrors 61 and 64 jointly form a resonator that is separate from the resonator formed by the high-reflection mirror 61 and the output coupler 65. The output coupler 65, meanwhile, also functions as an optical output terminal for outputting the pulsed laser light L0.

The high-reflection mirror 61 transmits the pumping light 51 from the pumping laser 5 and reflects the pulsed laser light from the Ti:sapphire crystal 62. The pumping light 51 inputted via the high-reflection mirror 61 enters the Ti:sapphire crystal 62. The optical input/output terminal surfaces of the Ti:sapphire crystal 62 are cut to a Brewster's angle. Through this, the reflection of laser light at this terminal surface is suppressed. The Ti:sapphire crystal 62 which the pumping light 51 has entered outputs the pulsed laser light L0 through oscillation using the energy obtained from the pumping light 51 that travels back and forth within the resonator. The pulsed laser light L0 emitted from the Ti:sapphire crystal 62 is diffracted by the grating 63. Here, the output coupler 65 is disposed relative to the grating 63 in, for example, the emission direction of zero-order diffracted light. In addition, the high-reflection mirror 64 is disposed relative to the grating 63 in the emission direction of ±m-order diffracted light. According to this configuration, by adjusting the angle of the high-reflection mirror 64 relative to the grating 63, the wavelength of the pulsed laser light L0 outputted by the Ti:sapphire laser 6 can be selected. As a result, it is possible to control the spectral line width of the pulsed laser light L0 outputted by the Ti:sapphire laser 6 to a spectral line width whose chromatic aberration can be ignored at the time of exposure.

6.2 Amplifier (PA)

Figure 15:
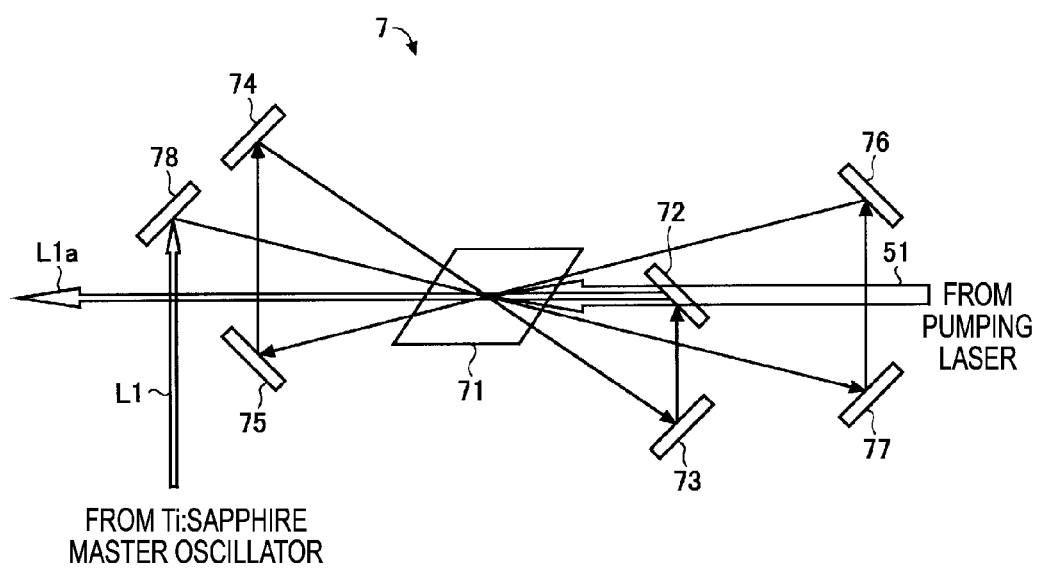
FIG. 15 illustrates an example of an amplifier according to the first through third embodiments.

FIG. 15 is a diagram illustrating an example of the aforementioned amplifier 7. Note that in this example, a multipass amplification-type power amplifier that does not include an optical resonator is given as an example. As shown in FIG. 15, the amplifier 7 includes a plurality of high-reflection mirrors 72 through 78 and a Ti:sapphire crystal 71. The plurality of high-reflection mirrors 72 through 78 form multiple passes so that the pulsed laser light L1 inputted from the Ti:sapphire laser 6 through the optical shutter 41 passes through the Ti:sapphire crystal 71 a plurality of times (in the present example, four times). The pumping light 51 from the pumping laser 5 enters the Ti:sapphire crystal 71 through the high-reflection mirror 72. The optical input/output terminal surfaces of the Ti:sapphire crystal 71 are cut to a Brewster's angle. The Ti:sapphire crystal 71 oscillates while obtaining energy from the pumping light 51 based on the pulsed laser light L1 that advances through the multiple passes. Through this, the pulsed laser light L1 undergoes multipass amplification with each of the plurality of passes. As a result, pulsed laser light L1a that has been amplified is emitted from the amplifier 7. Note that the high-reflection mirror 72 allows the pumping light 51 to pass therethrough but reflects the laser light from the Ti:sapphire crystal 71.

6.3 Amplifier Including Optical Resonator (PO)

Figure 16:
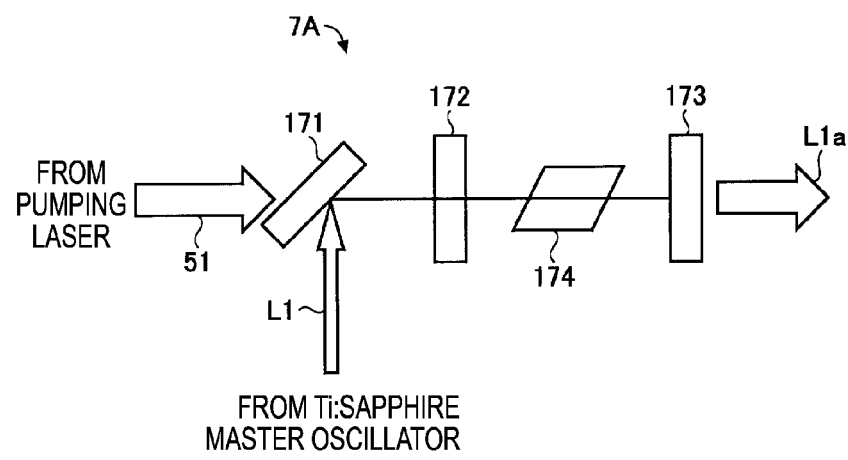
FIG. 16 schematically illustrates a Fabry-Perot amplifier according to the first through third embodiments.

It is also possible to replace the amplifier 7 with a power oscillator that includes an optical resonator therein. FIG. 16 schematically illustrates a Fabry-Perot amplifier 7A. As shown in FIG. 16, the amplifier 7A includes a high-reflection mirror 172, an output coupler 173, a Ti:sapphire crystal 174, and a high-reflection mirror 171. The high-reflection mirror 172 and the output coupler 173 jointly form an optical resonator. The Ti:sapphire crystal 174 is disposed in the optical path in this optical resonator. The high-reflection mirror 171 guides the pulsed laser light L1 inputted from the Ti:sapphire laser 6 through the optical shutter 41 and the pumping light 51 from the pumping laser 5 into the optical resonator.

The high-reflection mirror 171 reflects the pulsed laser light L1 from the Ti:sapphire laser 6 back toward the optical resonator, and allows the pumping light 51 from the pumping laser 5 to pass therethrough toward the optical resonator. In addition, the high-reflection mirror 172 that forms the optical resonator at one side allows the pulsed laser light L1 and the pumping light 51 to pass therethrough and reflects laser light from the Ti:sapphire crystal 174. The optical input/output terminal surfaces of the Ti:sapphire crystal 174 are cut to a Brewster's angle. Accordingly, the reflection of laser light at this terminal surface is suppressed. By oscillating while obtaining energy from the pumping light 51 based on the pulsed laser light L1 that travels back and forth within the optical resonator, the Ti:sapphire crystal 174 emits amplified pulsed laser light L1a. The pulsed laser light L1a that has been amplified is outputted via the output coupler 173.

The aforementioned descriptions are intended to be taken only as examples, and are not to be seen as limiting in any way. Accordingly, it will be clear to those skilled in the art that variations on the embodiments of this disclosure can be made without departing from the scope of the appended claims.

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

Although the aforementioned embodiment describes an example in which there is one amplifier 7, a plurality of amplifiers 7 may be used. Furthermore, although the Ti:sapphire laser 6 and the amplifier 7 are pumped by a shared pumping laser 5, separate pumping lasers may be used. In addition, a laser that oscillates second harmonic light, such as an Nd:YLF laser or an Nd:YVO4 laser, may be used as the pumping laser 5. In addition, a laser that generates second harmonic light, such as an erbium-doped fiber-optic laser, may be used in place of the Ti:sapphire laser 6. This laser may be pumped using a semiconductor laser. Furthermore, the wavelength conversion unit 8 is not limited to that described in this disclosure but may be provided in any manner as long as the light entering into the wavelength conversion unit 8 is converted into light having a wavelength in the gain bandwidth of the amplification device 3, such as, for example, a wavelength of approximately 193 nm. For example, a CLBO crystal may be used instead of the LBO crystal 9 as the wavelength conversion element included in the wavelength conversion unit 8.

What is claimed is:

1. A laser system comprising:
   a master oscillator that outputs pulsed laser light;
   an amplification device that amplifies the pulsed laser light outputted from the master oscillator; and
   a controller that controls the master oscillator and the amplification device,
   wherein the master oscillator includes
      a pumping laser that outputs pumping light,
      a seed laser that is oscillated by the pumping light,
      an amplifier that amplifies the pulsed laser light outputted by the seed laser using the pumping light, and
      at least one optical shutter disposed in an optical path between the seed laser and the amplifier, and
   wherein the controller controls opening and closing of the optical shutter and discharging of the amplification device so that the amplification device discharges when the pulsed laser light that has passed through the optical shutter passes through the amplification device.

2. The laser system according to claim 1, wherein the seed laser outputs the pulsed laser light having a pulse width that is longer than a period for which the controller puts the optical shutter in an open state.

3. The laser system according to claim 1, wherein the controller controls opening and closing of the optical shutter and discharging of the amplification device so that the amplification device discharges for a period that is longer than the period in which the pulsed laser light that has passed through the optical shutter passes through the amplification device.

4. The laser system according to claim 1,
   wherein the optical shutter comprises:
   an electro-optical element;
   a first optical filter disposed on an optical input end side of the electro-optical element;
   a second optical filter disposed on an optical output end side of the electro-optical element; and
   a power source that is connected to the electro-optical element, the power source applying a voltage to the electro-optical element.

5. The laser system according to claim 4, wherein the electro-optical element is a Pockels cell.

6. The laser system according to claim 4, wherein the first and second optical filters each include at least one polarizer.

7. A laser light generation method for an apparatus that includes a master oscillator having a pumping laser that outputs pumping light, a seed laser that is oscillated by the pumping light, an amplifier that amplifies the pulsed laser light outputted by the seed laser using the pumping light, and at least one optical shutter disposed in the optical path between the seed laser and the amplifier, and an amplification device that amplifies the pulsed laser light outputted from the master oscillator, the method comprising:

controlling opening and closing of the optical shutter and discharging of the amplification device so that the amplification device discharges when the pulsed laser light that has passed through the optical shutter passes through the amplification device.

\* \* \* \* \*